United States Patent [19]

Pike

[11] Patent Number: 5,112,418
[45] Date of Patent: * May 12, 1992

[54] METHOD FOR BONDING JOINTS WITH AN ORGANIC ADHESIVE USING A WATER SOLUBLE SILANE MODIFIED AMORPHOUS HYDRATED METAL OXIDE PRIMER

[75] Inventor: Roscoe A. Pike, Granby, Conn.

[73] Assignee: United Technologies Corporation, Hartford, Conn.

[*] Notice: The portion of the term of this patent subsequent to Dec. 19, 2006 has been disclaimed.

[21] Appl. No.: 450,335

[22] Filed: Dec. 13, 1989

[51] Int. Cl.$^5$ ............................................. C09J 5/04
[52] U.S. Cl. ................................. 156/319; 106/286.1; 106/287.13; 106/287.16; 156/314; 252/313.1; 428/469; 428/472
[58] Field of Search ................................ 156/314, 319; 252/313.1; 106/287.13, 287.16, 286.1; 428/469, 472

[56] References Cited

U.S. PATENT DOCUMENTS

| | | |
|---|---|---|
| 2,768,909 | 10/1956 | Haslam . |
| 2,820,693 | 1/1958 | Hervert et al. ............... 252/313.1 |
| 2,943,955 | 7/1960 | Brill . |
| 2,984,628 | 5/1961 | Alexander et al. ............ 252/313.1 |
| 3,002,854 | 10/1961 | Brill et al. . |
| 3,017,282 | 1/1962 | Brill et al. . |
| 3,547,670 | 12/1970 | Fuchs et al. . |
| 3,657,003 | 4/1972 | Kenney ........................ 252/313.1 |
| 3,689,300 | 9/1972 | Bunger et al. ................ 106/287.13 |
| 3,861,978 | 1/1975 | Connole et al. ................ 156/319 |
| 3,989,876 | 11/1976 | Moti et al. . |
| 4,010,247 | 3/1977 | Wassermann et al. . |
| 4,584,108 | 4/1986 | Block . |
| 4,623,591 | 11/1986 | Pike ............................ 156/314 |
| 4,888,079 | 12/1989 | Pike et al. .................... 156/319 |

OTHER PUBLICATIONS

Arthur W. Thomas and An Pang Tai, "The Nature of Aluminum Oxide Hydrols", The Journal of the American Chemical Society, vol. 54, No. 3, Mar. 5, 1932.

Primary Examiner—John J. Gallagher
Attorney, Agent, or Firm—George J. Romanik

[57] ABSTRACT

A method of bonding a plurality of articles together with an organic adhesive by using a primer that provides increased crack propagation resistance without the use of organic solvents. The method comprises reacting aluminum, titanium silicon, iron, or zirconium with HBr or HI. The reaction product is oxidized with a water soluble oxidizing agent to form a hydrosol. The hydrosol is then mixed with an organofunctional silane to form the primer. The primer is applied to the surface of an adherend prior to the application of adhesive.

7 Claims, No Drawings

METHOD FOR BONDING JOINTS WITH AN ORGANIC ADHESIVE USING A WATER SOLUBLE SILANE MODIFIED AMORPHOUS HYDRATED METAL OXIDE PRIMER

DESCRIPTION

1. Technical Field

The field of art to which this invention pertains is methods for adhesively bonding two or more members.

2. Background Art

Weight saving and manufacturing cost benefits have led to the increase in use of adhesively bonded structures in the aircraft and aerospace industries. In order to be a viable alternative to, for example, metal fasteners, these adhesive bonds should maintain the strength typical of conventional fastener systems. In many applications the bonds are put under a variety of environmental and mechanical stresses. For example, frequently these bonds are exposed over long periods of time to wet environments which can result in a loss of bond strength. The loss of strength can result from the extension of cracks and other deformations that occur in the adhesive and which are exacerbated by the moist environment. As a result of this deficiency, extensive research and development efforts have been undertaken to define methods and identify materials which improve bonded joint performance in humid conditions. For example, it is known that surface preparation is important in the bonding of aluminum and titanium. Thus it is essential that before bonding, the adherend is cleaned and chemically pretreated to produce a surface which combines with the adhesive to develop the bond strengths which meet application requirements. A variety of pretreatments for aluminum have been developed to produce improved bondability. These include acid etching (FPL), and anodized treatments with sulfuric (SA), chromic (CAA) and phosphoric acid (PAA). The latter, PAA, is generally accepted as the most effective surface treatment in terms of bond strength and durability at the present time. It has been shown by in depth surface analysis using scanning transmission electron microscopy that the PAA treatment produces fine oxide protrusions of greater length and magnitude than other surface treatments. These whiskers are believed to account for the strength enhancement achieved with joints made using PAA treated adherends. Thus, mechanical interlocking by whisker reinforcement of an adhesive appear to play a role in enhancing adhesive bonding. The probability that chemical interaction is of major importance, depending upon the polymer/metal combination, is also believed.

Commonly assigned U.S. Pat. No. 4,623,591 describes an amorphous hydrated metal oxide primer for adhesively bonded articles that results in a bond resistant to crack propagation. A metal article has a layer of amorphous hydrated metal oxide formed by applying and subsequent hydrolysis of a layer of $M_xOR_y$. In the formula $M_xOR_y$, x is 1, y is 3 or 4, M is any metal capable of forming a stable alkoxide and R is an organic radical. The bonded joint is preferably made by applying to a surface of a metal article a layer of the above-described described metal alkoxide. The metal article is exposed to moisture and a temperature from about 25° C, to about 125° C, and adhesive is placed in contact with and between the articles to be bonded. The bonded articles are then exposed to pressure and optional heat resulting in a joint resistant to crack propagation. However, these inorganic primers are generated by application of an organic solution of a metal alkoxide to the substrate. Because of increased environmental considerations, a thrust of current adhesive technology is to eliminate the use of organic solvents. Thus, although the above surface preparations have provided advantages, there is a need for environmentally safe technology to aid in the advancement of lightweight aerospace-type metal structures.

Accordingly, there is a constant search in this field of art for new methods of providing lightweight, structurally sound, adhesively bonded joints.

DISCLOSURE OF INVENTION

This invention is directed toward a method of bonding a plurality of components together with an organic adhesive by using a primer that provides increased crack propagation resistance without the use of organic solvents. The method comprises reacting aluminum, titanium,, silicon, iron, or zirconium with HBr or HI. The reaction product is oxidized with a water soluble oxidizing agent to form a hydrosol. The hydrosol is then mixed with an organofunctional silane and then applied to the surface of one of the adherends prior to the application of the adhesive.

Further disclosed is a method for manufacturing the inorganic primers and bonded articles using the disclosed primer.

This primer provides bonds for adhesively bonded joints that have equal or greater resistance to crack propagation than those made with organic primers. Thus, this invention makes a significant advance to the aerospace industry providing new technology relating to adhesive bonding.

Other features and advantages will be apparent from the specification and claims.

BEST MODE FOR CARRYING OUT THE INVENTION

Aluminum is preferred as the metal for the water soluble amorphous hydrated metal oxides of this invention. However, it is believed that Ti, Si, Fe, Zr and other hydrosol forming metals or combinations thereof may also be used.

Any acid HX may be used that results in a metal salt which undergoes oxidation to produce a metalOH bond. Typically, X is a halogen and may be Br or I. Cl is not preferred since the chlorine is not oxidized during the oxidation step described below.

Typically, any oxidizing agent can be used that is water soluble. Exemplary oxidizing agents are $H_2O_2$, $O_3$, organohydroperoxides (e.g., t-butyl hydro peroxide) and ozonides.

Typically, the amorphous hydrated metal oxides of this invention are made by reacting the metal with an acid. It is preferred to use less than an equivalent amount of acid because it is believed this aids in the solubilization of the remaining gel. Then a method is used to increase the metal to anion ratio of the above product i.e., to reduce the anion concentration. The lowest amount of anion that maintains the hydrosol is preferred since excess halide may lead to corrosion. A preferred method of increasing the metal to anion ratio is the oxidation of the above reaction product. Dialysis (e.g. aqueous dialysis through a semi-permeable membrane) can also be used to increase the metal to halide ratio and will further increase the ratio above what can be achieved with oxidation. The reaction is empirically illustrated using aluminum as $$aAl + 3_{a-b}H_2O + bHX \rightarrow Al_a(OH)_{3a-b}X_b + H_2 \uparrow$$

These water soluble inorganic compositions (hydrosols) comprise colloidal aqueous solutions of hydrated alumina stabilized by small amounts of halide. Typically, the ratio of a to b in the above formula is about 5/1 to about 800/1. It is preferred that a ratio for a to b of from about 8 to 1 to about 800/1 is used for adhesively bonding structures with the water soluble inorganic primer because the least amount of anion to maintain the hydrosol is desirable because excess halide may lead to corrosion. Ratios of a to b higher than about 30 to 1 may be achieved by dialysis of the solution after oxidation.

To the above described aqueous solution of the hydrosol is added an organofunctional hydrolyzable silane. These silanes should be multifunctional, for example, difunctional, or trifunctional, and the organofunctionality selected for any given silane should be capable of interacting with the resin used in a particular adhesive system. The organofunctionality may be manifested as an unsaturated, aliphatic constituent, acrylic, i.e, ethylacrylate, epoxy, mercaptan, methoxy, amine, diamine, ureido, or other active functional groups. In addition, the functionality may be incorporated into an aromatic as well as alkane branch on the silane backbone Some examples, but not an exhaustive list, of hydrolyzable organofunctional silanes useful in practicing this invention are shown in Table I along with their commerical designations.

TABLE I

| Organofunctional Silane | Dow Corning* | Union Carbide* |
|---|---|---|
| Vinyltriethoxy Silane | Q9-6300 | A-171 |
| Gamma Methacryloxy Propyl Triethoxy-Silane | Z-6030 | A-174 |
| Beta-(3,4-Epoxycyclohexyl) Ethyltrimethoxy Silane | — | A-186 |
| Gamma Glycidoxypropyl-trimethoxy Silane | Z-6040 | A-187 |
| Gamma Mercapto-propyltrimethoxy Silane | Z-6062 | A-189 |
| Gamma Aminopropyl trimethoxy Silane | Z-6011 | A-1102 |
| N-Beta(Aminoethyl)-Gamma-Aminopropyl Trimethoxy Silane | Z-6020 | A-1120 |
| Ureidosilane | — | A-1160 |

*Dow Corning - Midland, MI
*Union Carbide - Danbury, CT

The silane is added in the amount desired to the solution of the hydrosol and mixed to form a homogenous solution. To effect homogeneity it may or may not require the addition of heat to the solution in order to dissolve the silane.

It has been found that the amount of silane added is important to the overall strength of the final bond and improved crack propagation prevention. It has been found that the ratio of metal hydrosol to silane in the final primer should be above 5 but below 20 to achieve the most acceptable results with the preferred ratio being between 9 to 15. It has been found that too little silane results in no improvement in the crack propagation resistance while too much silane results in reduced adhesive properties.

The aqueous solutions of these primers are then applied to one of the components (referred to hence as the adherend) and typically dried, for example, at about 50° C. to about 170° C. for about 15 minutes. It is believed as the water evaporates from the primer further condensation occurs to produce a polymeric film of greater molecular weight.

The thickness of this primer layer can vary effectively from about 0.15 microns ($\mu$) to about $10\mu$. Preferably the thickness is about $0.3\mu$ to about $1.0\mu$. Above about $10\mu$, the layer can be so thick as to create stress risers and to form a weak boundary layer. Below about $0.15\mu$, the layer does not provide the properties such as crack propagation resistance at the levels typically required. In addition, it is preferable to apply the primer to the adherend surface with a plurality of layers as this facilitates removal of volatiles (e.g. water) which can be more difficult to achieve from a single thick application.

The adherend useful for bonding with these primers will typically comprise aluminum, titanium, iron, magnesium or their alloys, glass, ceramic or glass or ceramic fiber reinforced composites. By alloy is meant the article having the major metal present in greater than a 50 percent by weight (%) amount. In addition, a primed adherend can be bonded to other articles (e.g. ceramic; glass), conventional fiber reinforced polymeric matrix composites such as an epoxy, polyimide, polyester, acrylic, urethane, cellulosic, rubber or phenolic based composite). Examples of fibers include glass, alumina, silicon carbide, graphite, amides and Kevlar ™ fiber (E. I. DuPont DeNemours Co., Wilmington, Del.).

Any of the above primers may comprise a single species of hydrated metal oxides and organofunctional silanes or mixtures of different types of hydrated metal oxides and silanes can be used to prime any of the above described adherends. It is preferred to use a like hydrated metal ion to prime a like metal composition. For example, the alumina primer for aluminum (or alloys thereof) adherens, titanium primer for titanium adherends etc. Thus, for example, properties such as prevention of crack propagation are enhanced when the alumina primer is applied to aluminum or its alloys.

Typically, a surface treatment material is used prior to primer application to provide the metal surface with an adhesive receptive quality. For example, conventional surface preparation compositions for aluminum are acidic in nature such as chromic acid, phosphoric acid and sulfuric acid.

Any conventional adhesive can be used for the practice of this invention that is useful for bonding the adherends, particularly metal adherends. For example, epoxide, polyimide, acrylic or urethane adhesives are used as these provide the properties most desired such as good strength. It is especially preferred to use epoxy or polyimide adhesives as they resist environmental stresses, are strong and are frequently chosen for aerospace applications. It is further desirable to use a primer having an organofunctional group which is of the same family as the adhesive functionality. For example, it is preferable to use a silane having an epoxy or amino functionality when bonding with an epoxy adhesive.

Any method of bonding may be used for the practice of this invention that provides an amorphous, hydrated metal oxide coated adherend bonded to another adherend with an adhesive. If a plurality of adherends are to be bonded, it is preferred to prime each adherend. It is also preferred to apply a layer of the primer to the adherend(s) by a solvent casting, dipping or spraying procedure. The primer coated adherends are then maintained at a temperature of about 25° C. to about 300° C. Below 25° C., the water solvent evaporation is typically too slow and above 300° C. loss of desirable metal properties or crystallization of the oxide surface may occur with an accompanying loss of mechanical strength. It is especially preferred to heat the primer coated adherends to a temperature of about 100° C. to about 200° C. as the lower temperatures minimize the risk of mechanical property degradation of, for example, aluminum adherends, such as with aluminum spars which have been shotpeened to induce compressive surface stresses. The application of the inorganic primer for field repair situations is also possible with the use of the lower application temperature.

It is also preferred to prepare the surface of the adherends prior to applying the water soluble primer. For example, where the surface adherend is a metal, i.e., aluminum, the aluminum adherends can be prepared with an acid such as phosphoric acid by, i.e., anodization. The adhesive is then applied by conventional methods to the adherends and they are joined together with the application of conventional pressures, temperatures and times appropriate for the adhesive use.

EXAMPLE 1

These wedge crack tests were performed in accordance with the American Society for Testing and Materials (A.S.T.M.) D3762 procedure. In that procedure a wedge is driven into the joint bond area a predetermined length, forming a crack between the two bonded adherends. The length of any subsequent crack propagation which occurs under temperature and humidity exposure is a measurement of the crack resistance of the bonded joint.

In a 250 cc round bottom flask equipped with a magnetic stirrer, air condenser, dropping funnel, and nitrogen inlet tube was mixed 6.75g (0.25 mole) of −170 to +300 mesh aluminum powder with 37 g of 47% hydriodic acid (0.14 mole) diluted with 40 cc of distilled water. The mixture was heated for six hours to dissolve the aluminum powder. The colorless solution was heated to 75°-80° C. with nitrogen purging, the solution reacted with 28g of 30% hydrogen peroxide diluted with 40 cc of distilled water added dropwise over a period of six hours. During the course of oxidation, iodine crystals collected in the air condenser. Nitrogen was bubbled through the solution after cooling for a period of sixteen hours to give a light straw yellow viscous solution. The solution was warmed to 50° C. and an additional 40 cc of distilled water was added. The solution contained some sediment which was removed by centrifuging. The resulting solution contained 3.5 weight percent solids and gave a Al/I ratio of 12.5/1. To 40 g of this solution was added 0.15 g of gamma-amino propyl triethoxy-silane (Union Carbide A-1100). The mixture was heated at 85° C. while stirring until the silane dissolved and the resulting solution became clear.

Six 2024 aluminum alloy adherends were treated with a 12% phosphoric acid solution by anodization (R.T.; 8 volts) and then a 3% solids aqueous solution of the above primer was applied to the aluminum adherends using one to three coatings by solvent casting (brushed on). The applied primer was air dried 15 minutes between each coating followed by heating for 30 minutes at 180° C. after which a supported film of a selective adhesive was applied to the primer coated adherends. A stop was placed between aluminum articles to ensure a bond line thickness of about 0.127 millimeters (mm) and 1.757 kilogram per square centimeter ($kg/cm^2$) pressure was applied to 177° C. for 120 minutes. In addition, a primer prepared as described in copending, commonly assigned U.S. Pat. No. 4,888,079 without the addition of the organofunctional silane of the present invention was also prepared and tested and the results are included in Table II.

TABLE II

COMPARISON OF SILANE MODIFIED AND UNMODIFIED WATER SOLUBLE INORGANIC PRIMER USING THE WEDGE CRACK TEST[a]

| Exposure Time/ Hrs | Crack Growth, mm | | | | |
|---|---|---|---|---|---|
| | Unmodified Primer[b] | Unmodified Primer[c] | Modified Primer[d] | Modified Primer[e] | A-100[f] Silane |
| $A_o$ (wedge insertion) | 50.5 | 52 | 50 | 49 | 39 |
| 1 | 5 | 2.4 | 3 | 2.5 | 18.5 |
| 8 | 11 | 5 | 6 | 4 | 43 |
| 32 | 14 | 9 | 7.5 | 6 | 55 |
| 56 | 17.5 | 12.5 | — | 6 | — |
| 80 | — | — | 9 | — | — |
| 200 | 22 | 15.5 | — | 6.2 | — |

[a] Tests carried out at 71° C./95% RH per ASTM D-3762. 2024 PAA treated aluminum specimens bonded with Dexter-Hysol EA9689 adhesive.
[b] Unmodified primer applied from 1.0 wt % solution.
[c] Unmodified primer applied from 3.3 wt % solution.
[d] Silane modification A-1100 at hydrated aluminum/silane ratio of 15.8.
[e] Silane modification A-1100 at hydrated aluminum/silane ratio of 9.3.
[f] A-1100 (3%) in 85/15 water-methanol solution.

As may be seen, significant reduction of the crack propagation is developed using the silane modified primer of the present invention over the unmodified primer.

Further testing was carried out to attempt to optimize the silane content in the primer. To this end, primers were prepared having Al/Si ratios of 1.7, 9.3 and 15.8 and tested to see the improvement in crack propagation prevention. The result of these tests are displayed in Table III below.

TABLE III

COMPARISON OF SILANE MODIFIED WATER SOLUBLE PRIMER USING THE WEDGE CRACK TEST[a]

| Exposure Time, Hrs | Crack Growth, mm | | | |
|---|---|---|---|---|
| | Al/Si ratio 1.7[b] | 1.7[c] | 9.3[b] | 15.8[b] |
| $A_o$ (wedge insertion) | 39 | 39 | 35 | 37 |
| 1 | 5 | 8 | 3 | 1.4 |
| 8 | 18 | 19 | 4 | 4.4 |
| 32 | 20 | 22 | 5.5 | 6.1 |
| 104 | 22 | 24.5 | 7.0 (128) | 9.5 |
| 200 | — | — | 7.0 | — |

[a] Tests carried out at 49° C./95% RH per ASTM D-3762. 2024 PAA treated aluminum specimens bonded with BASF-Narmco A adhesive.
[b] Silane modification A-1100
[c] Silane modification Z-6020

The table lists the initial crack length prior to exposure as well as the increase in each crack length over time. It is apparent from these results that a very low Al/Si ratio results in poor crack propagation prevention and that the preferred ranges result in significantly improved reduction in the propagation of the crack.

Different adhesives were also tested using the present primer as described in the examples. There was an attempt to determine the universality of such a primer. Table IV shows the result of the same ASTM D-3762 crack propagation test resulting from the previously described primer of the example paced on 2024 PAA treated aluminum adherend. As demonstrated, improved properties are achieved using the primer with a variety of adhesives.

TABLE IV

| | COMPARISON OF DIFFERENT ADHESIVES* | | | | | |
|---|---|---|---|---|---|---|
| Exposure Time/Hrs | 3M-AF163 | 3M-AF191 | NARMCO A | DEXTER 9689 | DEXTER 9689 | AMERICAN CYANAMID FM300 |
| $A_o$ (wedge insertion) | 33.4 | 37.8 | 36 | 49.0 | 49.5 | 53.5 |
| 160 Hrs | — | 6.0 | — | — | — | 5.2 |
| 176 Hrs | 8.0 | — | — | — | — | — |
| 200 Hrs | — | — | 7.0 | 5.3 | 5.1 | — |

*Silane modification A-1100, Al/Si ratio 9.3

This primer may be used to advantage in bonding metal to metal, metal to composites or composites to composites. In addition, it may be applied to articles to aid in adhesion of coatings such as with plastic packaged microelectronic devices, wire coatings, honeycomb construction, or even reinforcing composite fibers, note commonly assigned U.S. Pat. No. 4,678,820. While this invention has been described in terms of a hydrated metal oxide, and organofunctional silane, a mixture of various hydrated metal oxides and organofunctional silane can be used.

This primer coating provides improved crack propagation resistance in moist environments. The resulting properties such as tensile and T-peel strengths of bonded joints made with the inorganic primer are at least equivalent to bonded joints made using conventional organic primers. Yet the inorganic primers can be utilized at thinner layers than the 5 to 10$\mu$ layers typical of organic primers. Thicker layers tend to set up stress rises (i.e. weak boundary layer) as the components segregate. Also, because of its thermal stability, the inorganic primer can be used equally as well with high temperature adhesives such as polyimides or with low temperature adhesives such as epoxy systems, unlike organic primers which are typically temperature specific.

Another major advantage of the inorganic primer is that it can be used on metal surfaces which have been treated by a variety of surface treatments and provide the same high level of crack propagation resistance. In contrast, organic primers produce different results dependent upon the surface pretreatments employed. In addition, conventional organic primer use strontium chromates as corrosion inhibitors and these cause toxicity problems in their manufacture and use. This invention provides a water borne hydrated metal oxide primer for adhesively bonded joints that results in greatly increased crack propagation resistance. Thus, it makes a significant advance in the aerospace industry by providing new technology relating to adhesively bonded joints.

It should be understood that the invention is not limited to the particular embodiments shown and described herein, but that various changes and modifications may be made without departing from the spirit and scope of this novel concept as defined by the following claims.

I claim:

1. A method for bonding a plurality of adherends together by placing a polymeric adhesive in contact with and between the adherends and applying pressure and optionally heat, to said adherends wherein the improvement comprises:
   a) reacting aluminum, titanium, silicon, iron or zirconium with HBr or HI,
   b) oxidizing the reaction product with a water soluble oxidizing agent to form a hydrosol and reduce the anion concentration;
   c) forming a mixture of said hydrosol and a hydrolyzable organofunctional silane; and
   d) applying said mixture to a surface of at least one of the adherends prior to applying adhesive on its surface.

2. The method of claim 1 wherein one of the adherends comprises aluminum, magnesium, titanium or their alloys, glass or ceramic.

3. The method of claim 1 wherein the oxidized reaction product is dialyzed to further reduce the anion concentration below the level obtainable with oxidation.

4. The method of claim 1 wherein the organofunctional silane is a difunctional or trifunctional.

5. A primer composition comprising an aqueous mixture of:
   a) a hydrosol wherein said hydrosol is the reaction product of aluminum, titanium, silicon, iron or zirconium with HBr or HI and said reaction product has been oxidized with a water soluble oxidizing agent to form said hydrosol and reduce the anion concentration; and
   b) a hydrolyzable organofunctional silane.

6. The composition of claim 5 wherein the organofunctional silane is difunctional or trifunctional.

7. A method for manufacturing a water soluble adhesive primer comprising:
   a) reacting alumina, titanium, silicon, iron or zirconium with HBr or HI,
   b) oxidizing the reaction product with a water soluble oxidizing agent to form a hydrosol and reduce the anion concentration; and
   c) adding a hydrolyzable organofunctional silane to said hydrosol to form a homogenous solution thereof.

* * * * *